US012812663B2

(12) United States Patent
Kurita et al.

(10) Patent No.: US 12,812,663 B2
(45) Date of Patent: Nov. 24, 2026

(54) TERMINAL

(71) Applicant: NTT DOCOMO, INC., Tokyo (JP)

(72) Inventors: Daisuke Kurita, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 592 days.

(21) Appl. No.: 17/911,931

(22) PCT Filed: Mar. 19, 2020

(86) PCT No.: PCT/JP2020/012491
§ 371 (c)(1),
(2) Date: Sep. 15, 2022

(87) PCT Pub. No.: WO2021/186719
PCT Pub. Date: Sep. 23, 2021

(65) Prior Publication Data

US 2023/0148261 A1 May 11, 2023

(51) Int. Cl.
*H04W 72/29* (2023.01)
*H04L 27/26* (2006.01)
*H04W 72/0453* (2023.01)

(52) U.S. Cl.
CPC ....... *H04W 72/29* (2023.01); *H04L 27/26025* (2021.01); *H04W 72/0453* (2013.01)

(58) Field of Classification Search
CPC .............. H04W 72/29; H04W 72/0453; H04L 27/26025; H04L 5/001; H04L 5/0007; H04L 5/0044; H04L 5/0048; H04L 5/0053
See application file for complete search history.

(56) References Cited

U.S. PATENT DOCUMENTS

| | | | | |
|---|---|---|---|---|
| 2016/0219535 | A1* | 7/2016 | Zhang | H04W 56/00 |
| 2018/0152851 | A1* | 5/2018 | Li | H04L 41/0681 |
| 2020/0267668 | A1* | 8/2020 | Xu | H04W 52/367 |
| 2021/0028909 | A1* | 1/2021 | Gaal | H04L 1/1864 |
| 2021/0153209 | A1* | 5/2021 | Guan | H04L 5/0023 |
| 2022/0264629 | A1* | 8/2022 | Ma | H04L 1/18 |

FOREIGN PATENT DOCUMENTS

| | | | |
|---|---|---|---|
| CN | 109842475 | A | 6/2019 |
| JP | 2008-245141 | A | 10/2008 |
| JP | 2019-047466 | A | 3/2019 |
| JP | 2020-025151 | A | 2/2020 |

OTHER PUBLICATIONS

3GPP TSG RAN WG1 Ad-Hoc Meeting 1901; R1-1900739; Source: Apple Inc.; Title: PRACH preamble for NR-U; Taipei, Taiwan, Jan. 21-25, 2019. See §1-§3. (Year: 2019).*
International Search Report issued in PCT/JP2020/012491 on Nov. 2, 2020 (2 pages).

(Continued)

*Primary Examiner* — Mohammed S Chowdhury

(74) *Attorney, Agent, or Firm* — Osha Bergman Watanabe & Burton LLP

(57) ABSTRACT

A terminal assumes that a control channel is allocated to a low frequency band and a shared channel is allocated to a high frequency band which is higher than the low frequency band.

5 Claims, 8 Drawing Sheets

(56) References Cited

OTHER PUBLICATIONS

Written Opinion of the International Searching Authority issued in PCT/JP2020/012491 on Nov. 2, 2020 (3 pages).
3GPP TS 38.300 V15.8.0; "3rd Generation Partnership Project; Technical Specification Group Radio Access Network; NR; NR and NG-RAN Overall Description; Stage 2 (Release 15)"; Dec 2019 (99 pages).
Office Action issued in Chinese Application No. 202080098526.1, mailed Jul. 4, 2024 (11 pages).
Office Action issued in Chinese Application No. 202080098526.1, mailed Jan. 27, 2025 (10 pages).
Office Action issued in Chinese Patent Application No. 202080098526.1, dated Jun. 27, 2025 (11 pages).

* cited by examiner

TERMINAL

TECHNICAL FIELD

The present disclosure relates to a terminal that supports a plurality of frequency bands.

BACKGROUND ART

The 3rd Generation Partnership Project (3GPP) specifies a 5th generation mobile communication system (also called 5G, New Radio (NR), or Next Generation (NG)), and a next-generation specifications called Beyond 5G, 5G Evolution, or 6G have been promoted.

NR has realized ultra-reliable and low latency communications (URLLC), and is planned to be applied to automatic driving of vehicles (inter-vehicle communication and the like). In such a case, it is desirable to provide NR communication across a range where the vehicle moves, that is, to expand its coverage.

NR (Release-15) is designed so that radio communication from initial access to data transmission/reception can be completed in a single frequency band (Non Patent Literature 1). A wide communication area can be formed by expanding the communication area (coverage) using a plurality of frequency bands covering the area.

On the other hand, in recent radio communication systems including NR, terminals (user equipment, UE) are compatible with a plurality of frequency bands, and it is generally possible to perform radio communication while simultaneously using a plurality of frequency bands.

CITATION LIST

Non Patent Literature

Non Patent Literature 1: 3GPP TS 38.300 V15.8.0, 3rd Generation Partnership Project; Technical Specification Group Radio Access Network; NR; NR and NG-RAN Overall Description; Stage 2 (Release 15), 3GPP, December 2019

SUMMARY OF INVENTION

Considering the above situation, there is room for improvement from the following viewpoints. Specifically, considering frequency characteristics for each frequency band, there are more suitable applications for each frequency band. For example, a low frequency band is easy to support coverage enhancement and mobility, and a high frequency band is easy to support large capacity and low delay communication.

Therefore, the following disclosure has been made in view of such a situation and has an object to provide a terminal that can use a plurality of frequency bands simultaneously and more appropriately.

One aspect of the present disclosure is a terminal (UE 200) including a transmission/reception unit (a radio signal transmission/reception unit 210) that transmits and receives a control channel and a shared channel, and a controller (controller 270) that assumes that the control channel is allocated to a low frequency band and the shared channel is allocated to a high frequency band which is higher than the low frequency band.

DESCRIPTION OF EMBODIMENTS

Figure 1:
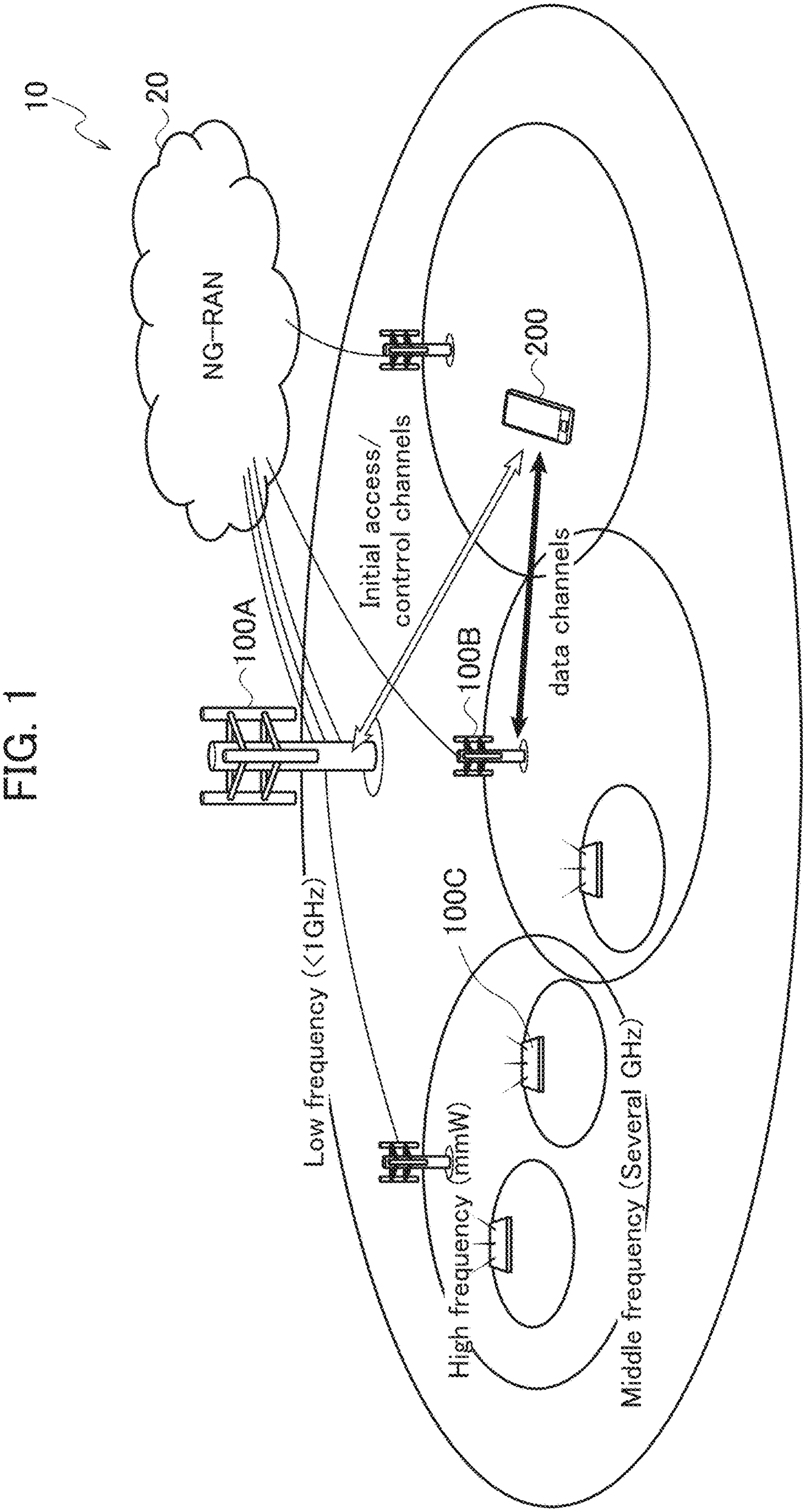
FIG. 1 is an overall schematic configuration diagram of a radio communication system 10.

Embodiments will be described below with reference to the drawings. The same functions and configurations are designated by the same or similar reference numerals, and description thereof will be omitted as appropriate.

(1) Overall Schematic Configuration of Radio Communication System

FIG. 1 is an overall schematic configuration diagram of a radio communication system 10 according to the present embodiment. The radio communication system 10 is a radio communication system complying with 5G New Radio (NR), and includes a next generation-radio access network 20 (hereinafter, referred to as NG-RAN 20) and a terminal 200 (hereinafter, referred to as a UE 200).

The radio communication system 10 may be a radio communication system according to a system called beyond 5G, 5G evolution, or 6G.

The NG-RAN 20 includes a radio base station 100A (hereinafter, referred to as a BS 100A), a radio base station 100B (hereinafter, referred to as a BS 100B) and a radio base station 100C (hereinafter, referred to as a BS 100C). Note that the specific configuration of the radio communication system 10 including the numbers of BSs and UEs is not limited to the example illustrated in FIG. 1.

The NG-RAN 20 actually includes a plurality of NG-RAN Nodes, which are specifically BSs, and is connected to a core network (5GC, not illustrated) according to 5G(NR). Note that the NG-RAN 20 and 5GC may be simply expressed as a "network".

The BSs 100A to 100C are radio base stations conforming to NR and execute radio communication conforming to NR with UE 200. The BSs 100A to 100C and the UE 200 may control radio signals transmitted from a plurality of antenna elements to support Massive MIMO that generates a beam with higher directivity, carrier aggregation (CA) using bundled plurality of component carriers (CC), and dual connectivity (DC) for simultaneous communication between the UE and each of the plurality of NG-RAN nodes.

Figure 2:
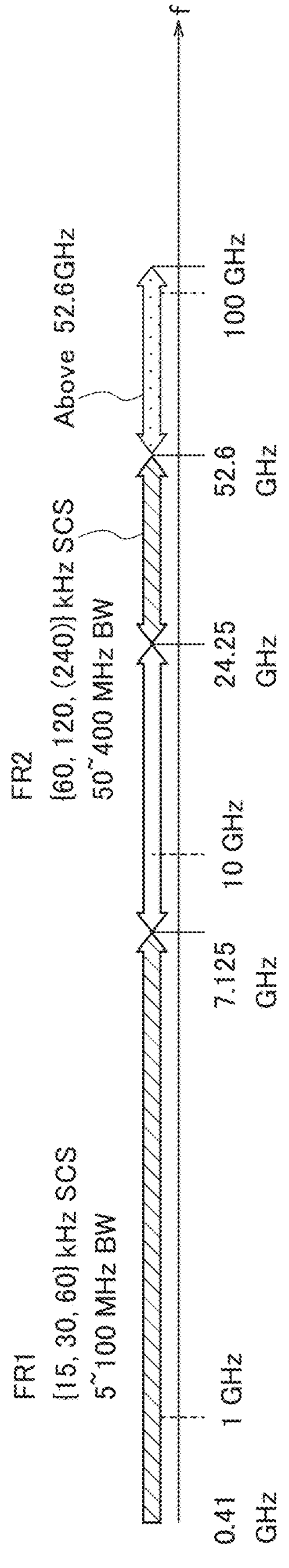
FIG. 2 is a diagram illustrating frequency ranges used in the radio communication system 10.

Further, the radio communication system 10 supports a plurality of frequency ranges (FR). FIG. 2 illustrates the frequency ranges used in the radio communication system 10. Note that the frequency range may be read as a frequency band or simply a band or a bandwidth.

As illustrated in FIG. 2, the radio communication system 10 supports FR1 and FR2. The frequency bands of each FR are as follows.

FR1: 410 MHz to 7.125 GHz

FR2: 24.25 GHz to 52.6 GHz

In FR1, subcarrier spacing (SCS) of 15, 30 or 60 kHz may be used and a bandwidth of 5 to 100 MHz (BW) may be used. In FR2, frequency is higher than FR1, SCS of 60 or 120 kHz (240 kHz may be included) is used, and a bandwidth of 50 to 400 MHz (BW) may be used.

Furthermore, the radio communication system 10 may support a frequency band higher than the frequency band of FR2. Specifically, the radio communication system 10 can support a frequency band of over 52.6 GHz and up to 114.25 GHz.

As illustrated in FIGS. 1 and 2, the radio communication system 10 can use a plurality of frequency bands (frequency ranges). Specifically, the BSs 100A to 100C and the UE 200 are compatible with the plurality of frequency bands, and can perform radio communication while simultaneously using the plurality of frequency bands.

The relationship between the BSs 100A to 100C and the frequency band is not particularly limited, but according to the present embodiment, the relatively large-scale BS 100A may use a low frequency band of less than 1 GHz, and the relatively medium-scale BS 100B may use a frequency band of about 3 to 5, 6 GHz. Further, the relatively small-scale BS 100C may use a millimeter wave (mmW) band, which exceeds 6 GHz.

As illustrated in FIG. 1, the size of the communication area (coverage) may differ depending on the frequency band used. Note that the BS 100B and BS 100C may be configured as integrated access and backhaul (IAB) nodes according to TAB in which radio access to the UE 200 and radio backhaul with the BS 100A are integrated.

Figure 3:
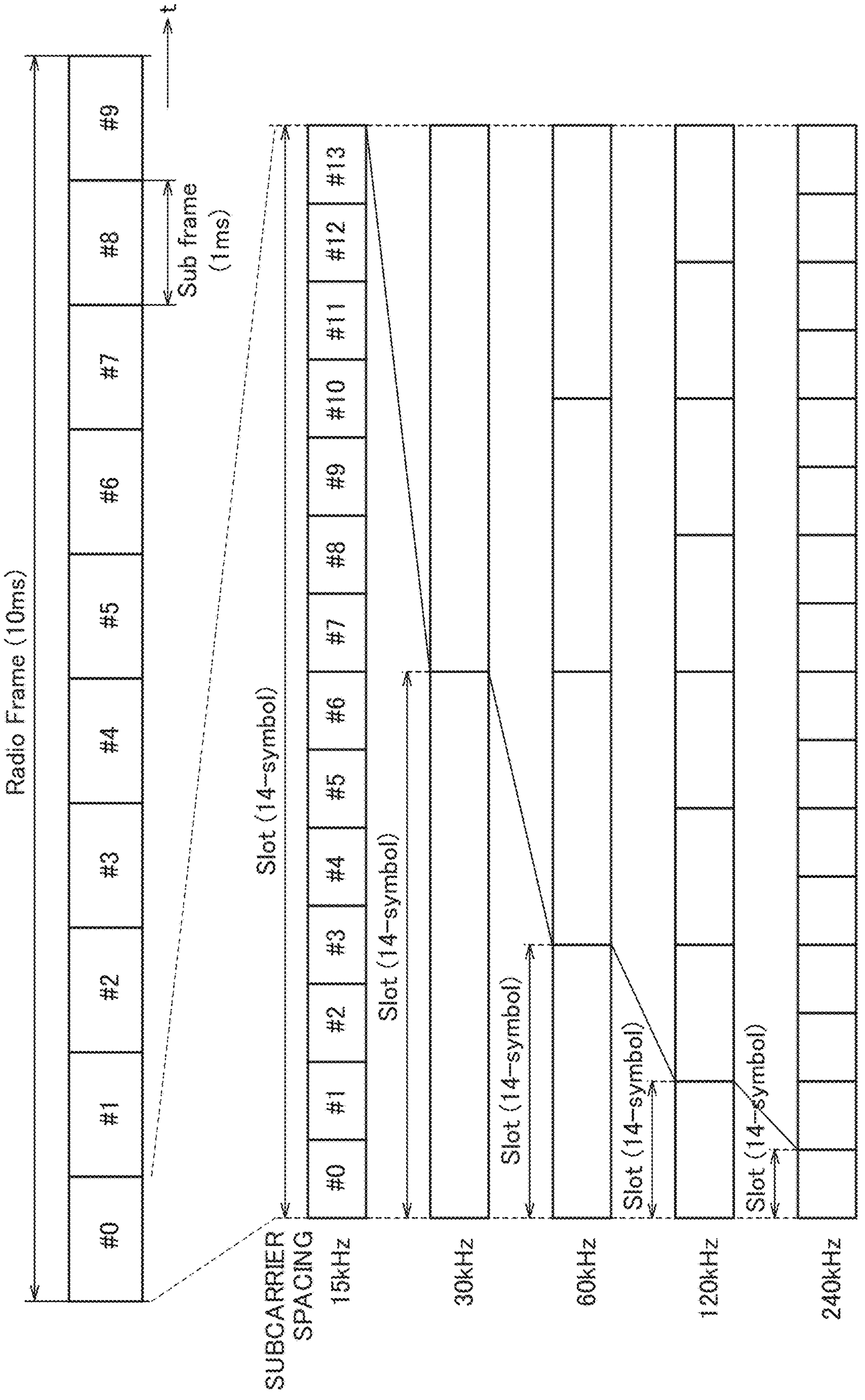
FIG. 3 is a diagram illustrating a configuration example of radio frames, subframes, and slots used in the radio communication system 10.

FIG. 3 illustrates a configuration example of radio frames, subframes, and slots used in the radio communication system 10.

As illustrated in FIG. 3, one slot is composed of 14 symbols, and the larger (wider) the SCS, the shorter the symbol period (and the slot period). Note that the number of symbols forming one slot is not necessarily 14 symbols (for example, there may be 28 or 56 symbols). In addition, the number of slots per subframe may differ depending on the SCS.

The time direction (t) illustrated in FIG. 3 may be called a time domain, a symbol period, a symbol time, or the like. Further, the frequency direction may be called a frequency domain, resource block, subcarrier, bandwidth part (BWP), or the like.

(2) Functional Block Configuration of Radio Communication System

Next, a functional block configuration of the radio communication system 10 will be described. Specifically, the functional block configuration of the UE 200 will be described.

Figure 4:
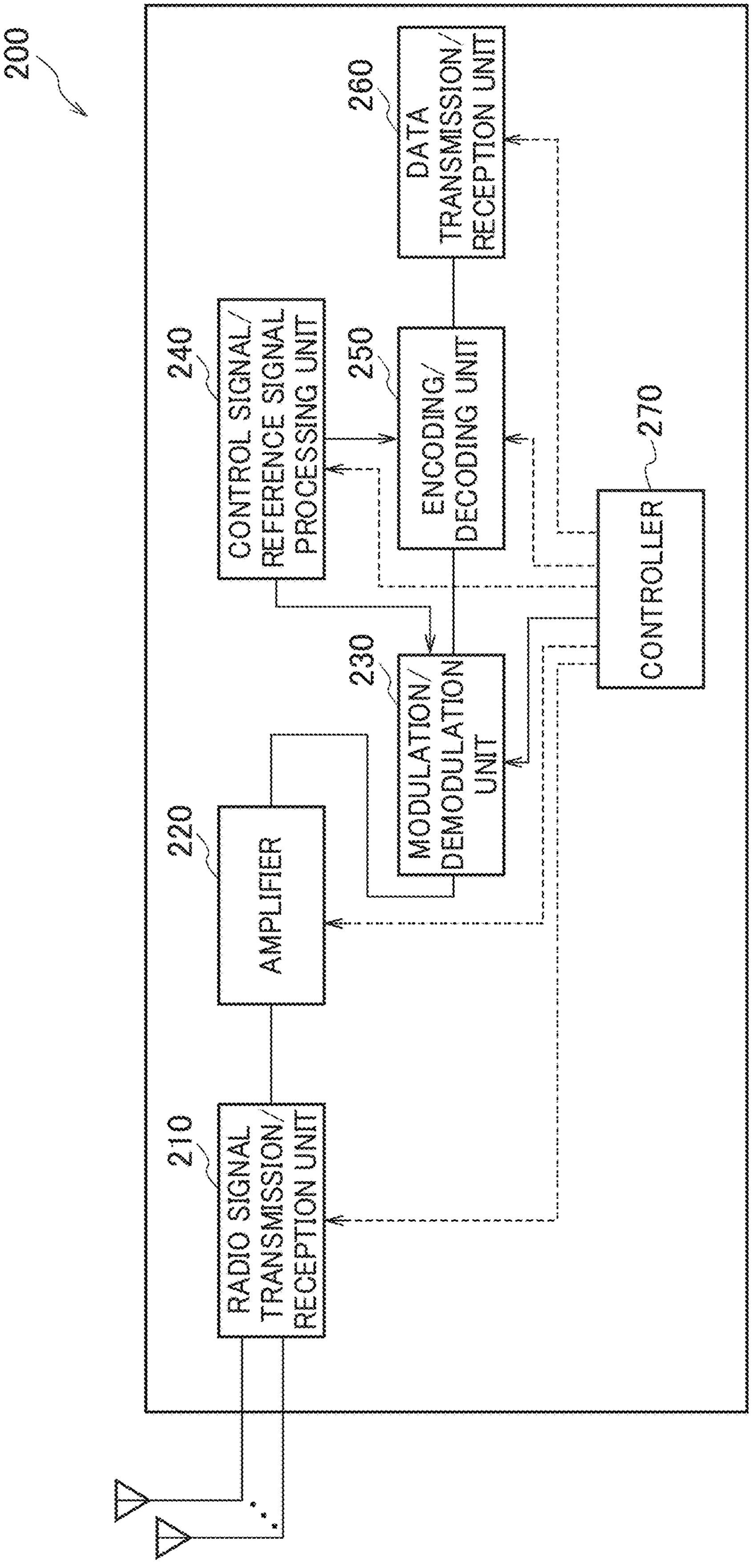
FIG. 4 is a functional block configuration diagram of a UE 200.

FIG. 4 is a functional block configuration diagram of a UE 200. As illustrated in FIG. 4, the UE 200 includes a radio signal transmission/reception unit 210, an amplifier 220, a modulating/demodulating unit 230, a control signal/reference signal processing unit 240, an encoding/decoding unit 250, a data transmission/reception unit 260, and a controller 270.

The radio signal transmission/reception unit 210 transmits and receives a radio signal according to NR. The radio signal transmission/reception unit 210 is compatible with Massive MIMO, CA bundling and using a plurality of CCs, DC performing simultaneous communication between the UE and each of the two NG-RAN nodes, and the like.

In particular, the radio signal transmission/reception unit 210 can transmit and receive a control channel and a shared channel. According to the present embodiment, the radio signal transmission/reception unit 210 constitutes a transmission/reception unit.

The control channel is a channel used for transmitting or receiving various control signals by the control signal/reference signal processing unit 240. Further, the shared channel is a channel used for receiving downlink user data addressed to the UE 200, transmitting uplink user data transmitted from the UE 200, and the like. Note that specific examples of the control channel and the shared channel will be described later.

Further, the radio signal transmission/reception unit 210 can receive an SS/PBCH block (SSB) which is a block of a synchronization signal/broadcast channel composed of a synchronization signal (SS) and a physical broadcast channel (PBCH). The SSB is mainly transmitted periodically so that the UE 200 can detect the cell ID and the reception timing at the start of communication. The SSB is also used for measuring reception quality of each cell.

The SSB transmission cycle (periodicity) may be defined as 5, 10, 20, 40, 80, or 160 milliseconds, and the like. Note that the UE 200 in initial access may be supposed to have a transmission cycle of 20 milliseconds.

The SS is composed of a primary synchronization signal (PSS: Primary SS) and a secondary synchronization signal (SSS: Secondary SS).

The PSS is a known signal that the UE 200 first attempts to detect in the cell search procedure. The SSS is a known signal transmitted to detect the physical cell ID in the cell search procedure.

The PBCH includes information necessary for the UE 200 to establish frame synchronization with an NR cell formed by the BS 100A or the like after detecting the SS/PBCH Block, such as a radio frame number (SFN: System Frame Number) and an index for identifying the symbol positions of multiple SS/PBCH Blocks within a half frame (5 milliseconds).

Further, the PBCH can also include system parameters needed to receive system information (SIB). Further, the SSB also includes a broadcast channel demodulation reference signal (DMRS for PBCH). The DMRS for PBCH is a known signal transmitted to measure the radio channel condition for PBCH demodulation.

The amplifier 220 is configured by a power amplifier (PA)/low noise amplifier (LNA) or the like. The amplifier 220 amplifies the signal output from the modulating/demodulating unit 230 to a predetermined power level. Further, the amplifier 220 amplifies the RF signal output from the radio signal transmission/reception unit 210.

The modulating/demodulating unit 230 executes data modulation/demodulation, transmission power setting, resource block allocation, and the like for each predetermined communication destination (the BS 100A or the like).

The control signal/reference signal processing unit 240 executes processing regarding various control signals transmitted and received by the UE 200 and processing regarding various reference signals transmitted and received by the UE 200.

Specifically, the control signal/reference signal processing unit 240 receives various control signals transmitted from the BS 100A or the like via a predetermined control channel, for example, control signals of a radio resource control layer (RRC). The control signal/reference signal processing unit 240 also transmits various control signals to the BS 100A and the like via a predetermined control channel.

In addition, the control signal/reference signal processing unit 240 executes processing using a reference signal (RS) such as a demodulation reference signal (DMRS) and a phase tracking reference signal (PTRS).

The DMRS is a known reference signal (pilot signal) in a base station-to-terminal basis for each terminal to estimate a fading channel used for data demodulation. The PTRS is a reference signal for each terminal for the purpose of estimating phase noise, which is a problem in high frequency bands.

In addition to the DMRS and PTRS, the reference signal includes a channel state information reference signal (CSI-RS) and a sounding reference signal (SRS).

In addition, the channel includes a control channel and a shared channel. The control channel includes a physical downlink control channel (PDCCH), a physical uplink control channel (PUCCH), a random access channel (RACH, a downlink control information (DCI) including a random access radio network temporary identifier (RA-RNTI)), a physical. broadcast channel (PBCH), and the like. Further, the SS included in the SSB may also be interpreted as a type of control channel.

The shared channel includes a physical downlink shared channel (PDSCH), a physical uplink shared channel (PUSCH), and the like. The shared channel may include a channel associated with the initial access, as described below. Further, the shared channel may be called a data channel, and the data may mean data transmitted via the shared channel (data channel).

Note that the control channel may be called a physical control channel and the shared channel may be referred to as a physical shared channel. Further, the shared channel may be called a shared channel.

The encoding/decoding unit 250 executes data division/connection, channel coding/decoding, and the like for each predetermined communication destination (the BS 100A or the like).

Specifically, encoding/decoding unit 250 divides the data output from the data transmission/reception unit 260 into a predetermined size, and executes channel coding on the divided data. Also, the encoding/decoding unit 250 decodes the data output from the modulating/demodulating unit 230 and connects the decoded data.

The data transmission/reception unit 260 executes transmission/reception of a protocol data unit (PDU) and a service data unit (SDU). Specifically, the data transmission/reception unit 260 executes assembling/disassembling or the like of PDU/SDU in a plurality of layers (a medium access control layer (MAC), a radio link control layer (RLC), a packet data convergence protocol layer (PDCP), and the like). Further, the data transmission/reception unit 260 executes data error correction and retransmission control based on HARQ.

The controller 270 controls each functional block configuring the UE 200. Particularly, in the present embodiment, the controller 270 can assume the relationship between the control channel, the shared channel, and the frequency band used for transmission and reception of the channels.

Specifically, the controller 270 assumes that the control channel is assigned to a low frequency band. Further, controller 270 assumes that the shared channel is assigned to a high frequency band that is higher than the low frequency band.

The control channel and the shared channel are as described above. Further, the specific frequencies of the low frequency band and the high frequency band are not particularly limited as long as the frequency band to which the control channel is assigned is lower than the frequency band to which the shared channel is assigned.

However, considering the frequency characteristics, the low frequency band may indicate less than 1 GHz, and the high frequency band may indicate 1 GHz or more. Alternatively, the high frequency band may be interpreted as a millimeter wave (mmW) band, and the low frequency band may be interpreted as a frequency band lower than the millimeter wave.

The controller 270 does not have to assume allocation of shared channels other than initial access in the low frequency band. In other words, the controller 270 assumes allocation of control channels in the low frequency band, but may assume allocation of shared channels related to the initial access.

The initial access may represent a series of processing executed between the UE 200 and the BS 100A or the like so that the UE 200 obtains the uplink (UL) synchronization and acquires an ID specified for radio access communication.

More generally, the initial access may be called a RACH process. Alternatively, the initial access may represent downlink (DL) synchronization and RACH.

Further, the controller 270 does not have to assume allocation of shared channels other than the UE 200 in an idle state in the low frequency band. In other words, the controller 270 assumes the allocation of the control channel in the low frequency band, but may assume the allocation of the shared channel associated with the UE 200 in the idle state.

The idle state of UE 200 may be referred to as an idle mode. Further, the idle state may be interpreted as an RRC idle state in which a connection in RRC between the UE 200 and the NG-RAN 20 is not set. Even in the idle state, the UE 200 can perform paging and system information monitoring, neighbor cell quality measurement, and the like.

Further, the controller 270 does not have to assume allocation of control channels including channels related to synchronization and initial access in the high frequency band. The channel related to synchronization may mean SS included in SSB and PBCH, as described above.

In other words, the controller 270 does not have to assume allocation of SS, PBCH, RACH, PDCCH, and PUCCH in the high frequency band.

The controller 270 may assume that different subcarrier spacing (SCS) is applied in the low frequency band and the high frequency band. Specifically, the controller 270 assumes that a narrow SCS (for example, 15 kHz is applied in the low frequency band, and an SCS that is wider than the SCS (for example, 60 kHz) is applied in the high frequency band. However, the narrow SCS does not necessarily have to be applied in the low frequency band and the wide SCS does not necessarily have to be applied in the high frequency band.

(3) Operation of Radio Communication System

Next, the operation of the radio communication system 10 will be described. Specifically, an operation regarding transmission/reception of the control channel and the shared channel between the UE 200 and the BS 100A will be described.

(3.1) Operation Overview

As described above, the radio communication system 10 is expected to use a plurality of frequency bands. In this embodiment, each channel (physical channel) in the physical layer is allocated to a different frequency band.

In the low frequency band (for example, f<1 GHz), a channel/signal related to initial access and a control channel are allocated.

Specifically, SS, PBCH, RACH, PDCCH, PUCCH, PDSCH (SIB1, Msg. 2/4), PUSCH (Msg. 3) may be allocated to the low frequency band. Here, PDSCH and PUSCH, which are shared channels, are used for transmission and reception of system information block 1 (SIB1) and Msg. 2 to 4 of a random access procedure.

In this manner, the UE 200 may assume allocation of the control channel to the low frequency band, and does not have to assume the allocation of the PDSCH and PUSCH to the low frequency band other than those for the UE 200 in the initial access and idle states.

A shared channel is allocated to the high frequency band (for example, f>1 GHz). Specifically, PDSCH and PUSCH may be allocated to the high frequency band.

As described above, the UE 200 assumes allocation of the shared channel to the high frequency band but does not have to assume SS, PBCH, RACH, PDCCH, and PUCCH allocation.

In addition, the channel configuration may be assumed that different SCSs are used in each frequency band. The UE 200 may report the UE capability of the UE 200 to the network in order to monitor consecutive PDCCH symbols.

The network schedules PDSCH and PUSCH in the high frequency band (hereinafter, referred to as a frequency band B) using the low frequency band (hereinafter, referred to as a frequency band A for convenience), and the UE 200 may assume such scheduling.

(3.2) Operation Example

Hereinafter, more specific allocation of the control channel and the shared channel, and operations related to PDSCH and PUSCH scheduling will be described.

(3.2.1) Operation Example 1

Figure 5:
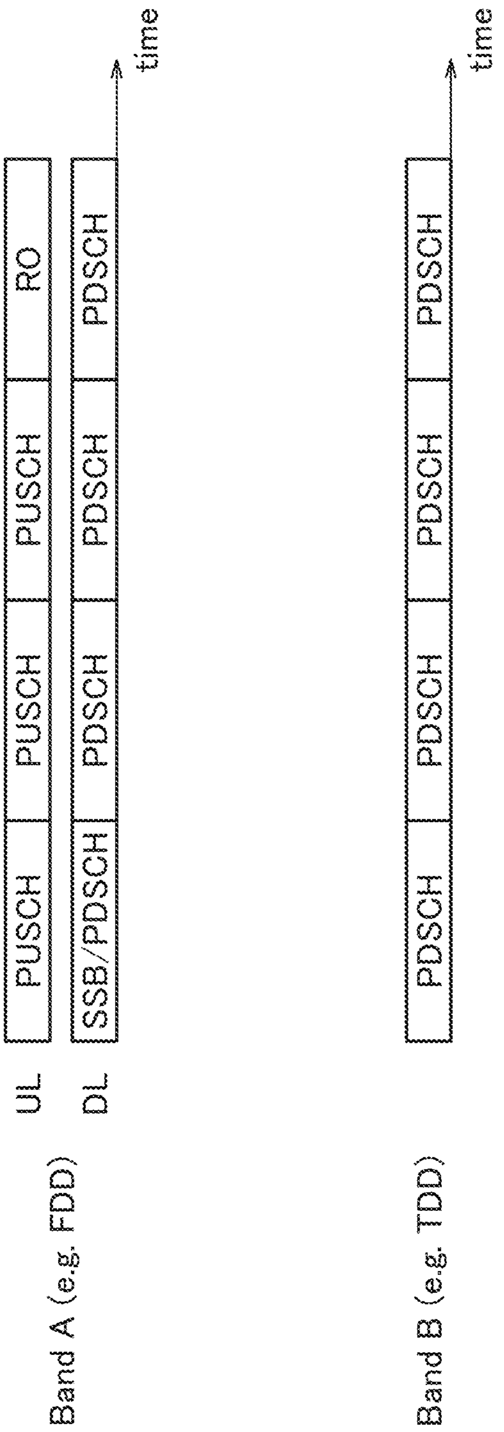
FIG. 5 is a diagram illustrating a specific example of allocation of control channels and shared channels to a frequency band A (low frequency band) and a frequency band B (high frequency band).

FIG. 5 illustrates a specific allocation example of the control channel and the shared channel (data channel) to the frequency band A (low frequency band) and the frequency band B (high frequency band).

As illustrated in FIG. 5, the frequency band A may be frequency division duplex (FDD) and the frequency band B may be time division duplex (TDD).

In the example illustrated in FIG. 5, PUSCH and RACH occasion (RO) are allocated to UL in the frequency band A, and SSB/PDSCH is allocated to DL in the frequency band A. Further, PDSCH is allocated to the frequency band B.

In this manner, the physical channel may be allocated to multiple frequency bands. Further, a configuration example in each frequency band of the physical channel may be as follows.

Configuration Example 1

Frequency band A: Initial access and control channel (SS, PBCH, RACH, PDCCH, PUCCH, PDSCH (SIB1, Msg. 2, 4), PUSCH (Msg.3))

Frequency band B: Data channel (PDSCH, PUSCH) (Configuration example 2)

Frequency band A: Initial access and control channel (SS, PBCH, RACH, PDCCH, PUCCH)

Frequency band B: Data channel and SIB1, Msg.2, 3, 4 (PDSCH, PUSCH)

Configuration Example 3

Frequency band A: Initial access and control channel (SS, PBCH, RACH, PDCCH, PUCCH, PDSCH (SIB1))

Frequency band B: Data channel and Msg.2, 3, 4 (PDSCH/PUSCH)

Further, regarding the configuration examples 1 to 3, the UE 200 may be assumed as follows. Note that SS may be transmitted only in the frequency band A. Since the frequency band A is assumed to be a low frequency band as described above, it may be assumed that a single antenna beam is installed in both the BS and the UE 200 (SSB index is always 1).

Configuration Example 1

Frequency band A: Allocation of PDSCH and PUSCH other than for initial access and UE 200 in the idle state is not assumed.

Frequency band B: Allocation of SS, PBCH, RACH, PDCCH and PUCCH is not assumed.

Configuration Example 2

Frequency band A: Allocation of PDSCH and PUSCH is not assumed.

Frequency band B: Allocation of SS, PBCH, RACH, PDCCH and PUCCH is not assumed.

Configuration Example 3

Frequency band A: Allocation of PUSCH other than for initial access and the UE 200 in the idle state is not assumed.

Frequency band B: Allocation of SS, PBCH, RACH, PDCCH, PUCCH, and PDSCH other than initial access and the UE 200 in the idle state is not assumed.

(3.2.2) Operation Example 2

As described above, the channel configuration may assume that different SCSs are used in each frequency band. For example, the SCS of the frequency band A can be 15 kHz and the SCS of the frequency band B can be 60 kHz.

Figure 6:
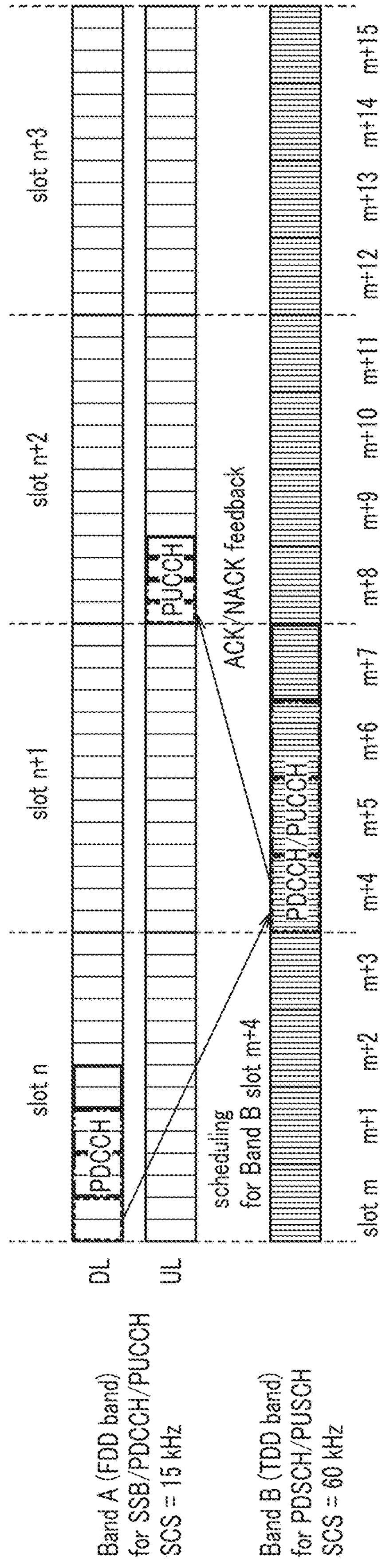
FIG. 6 is a diagram illustrating a configuration example of a control channel when different SCSs are used in the frequency band A and the frequency band B.

FIG. 6 illustrates a configuration example of the control channel in a case where different SCSs are used in the frequency band A and frequency band B.

As illustrated in FIG. 6, one subframe (one slot) of the frequency band A may be used to control one subframe (four slots) of the frequency band B. In this manner, the PDCCH in the frequency band A may control different slots in the frequency band B for each symbol.

The UE 200 monitors a plurality of consecutive PDCCH symbols in the slot of the frequency band A. Also, the UE 200 may report the availability of PDCCH monitoring for all symbols in the slot of the frequency band A to the network as UE capability.

Furthermore, the UE 200 may report to the network that M symbols as a gap are required for every consecutive N symbols as UE capability in order to monitor a plurality of consecutive PDCCHs in slots of the frequency band A.

Figure 7:
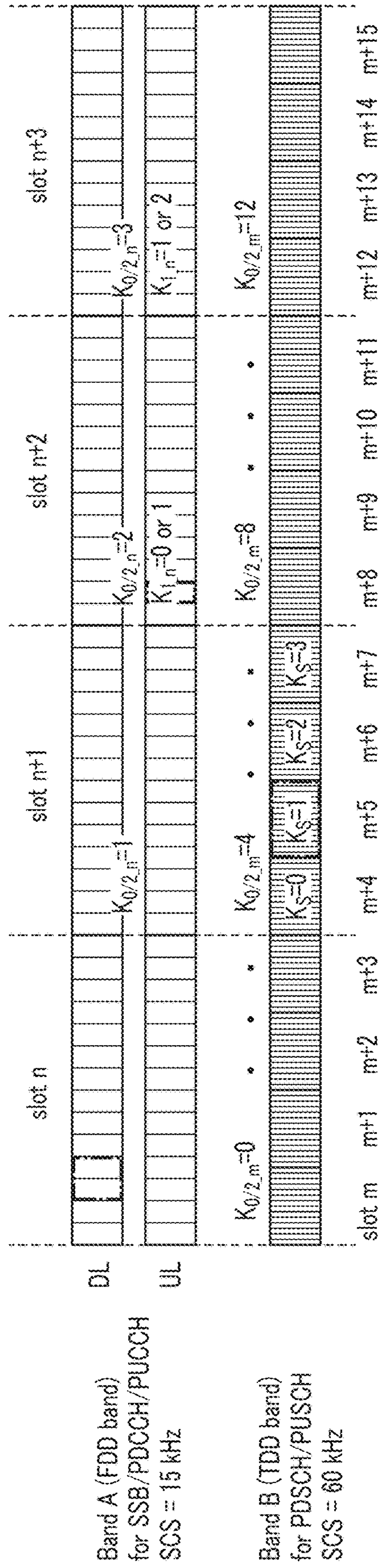
FIG. 7 is a diagram illustrating an example of PDSCH and PUSCH scheduling.

FIG. 7 illustrates an example of PDSCH and PUSCH scheduling. Also in FIG. 7, the SCS of the frequency band A can be set to 15 kHz and the SCS of the frequency band B can be set to 60 kHz.

The PDSCH and PUSCH scheduling methods may be as follows.

(Example 1): The slot ($K_{0/2\_m}$) of the frequency band B overlapping with the first scheduling symbol of the frequency band A is set to 0, and the PDSCH/PUSCH slot of the frequency band B is instructed. The symbols in the slot may be instructed using a start and length indicator value (SLIV).

(Example 2): The slot ($K_{0/2\_n}$) having the scheduling symbol of the frequency band A is set to 0, and the slot of the frequency band A that overlaps the PDSCH/PUSCH slot of the frequency band B is instructed. Further, by using the location (Ks) from the first slot, the slot of the frequency band B is instructed, or the slot of the frequency band B is instructed by using SLIV (in this case, S can be a value of 0 to 14×4−1.)

(Example 3): The first symbol of the slot of the frequency band B overlapping with the first scheduling symbol of the frequency band A is set to 0, and the resource of PDSCH/PUSCH is instructed using SLIV.

Furthermore, the ACK/NACK feedback of a hybrid automatic repeat request (HARQ) may be as follows.

(Example 1): The slot ($K_{1\_n}$) having the scheduling symbol of the frequency band A is set to 0, and the slot is instructed.

(Example 2): The slot ($K_{1\_n}$) in the frequency band A that overlaps with the PDSCH in the frequency band B is set to 0, and the slot is instructed.

(4) Action/Effect

According to the above-described embodiment, the following operational effects can be obtained. Specifically, the UE 200 can assume that the control channel is assigned to the low frequency band (frequency band A) and the shared channel is assigned to the high frequency band (frequency band B).

The control channel is allocated to the low frequency band (e.g., less than 1 GHz) that is easily compatible with coverage enhancement and mobility, and the shared channel is allocated to the high frequency band (e.g., 1 GHz or more) that is easily compatible with high-capacity and low-delay communication so that appropriate channel allocation according to the frequency characteristics of each frequency band can be realized.

In other words, according to the radio communication system 10 that can assume such channel allocation, a plurality of frequency bands can be used simultaneously and more appropriately.

According to the present embodiment, the UE 200 may not assume allocation of the shared channel other than initial access in the low frequency band. That is, the UE 200 assumes allocation of the control channel in the low frequency band, but may assume allocation of the shared channel related to initial access. Therefore, the success rate of initial access can be further increased.

According to the present embodiment, the UE 200 does not have to assume allocation of the shared channel other than the UE 200 in the idle state in the low frequency band. In other words, while assuming allocation of the control channel in the low frequency band, allocation of the shared channel associated with the UE 200 in the idle state may be assumed. Therefore, the success rate of the transition from the idle state to the connected state can be further increased.

According to the present embodiment, the UE 200 may not assume allocation of the control channel including channels related to synchronization and initial access in the high frequency band. Therefore, the UE 200 can quickly assume that the control channel is allocated to the low frequency band.

According to the present embodiment, the UE 200 may assume that different subcarrier spacing (SCS) is applied in the low frequency band and the high frequency band. Therefore, flexible channel scheduling using a plurality of frequency bands can be realized.

(5) Other Embodiments

Although the embodiment has been described above, it is obvious to those skilled in the art that the embodiment is not limited to the description of the embodiment and various modifications and improvements can be made.

For example, the above embodiment has described an example that the frequency band A (low frequency band) is less than 1 GHz and the frequency band B (high frequency band) is 1 GHz or more; however, the frequency range of each frequency band may be different. For example, the high frequency band may be a millimeter wave band exceeding 6 GHz. Further, in this case, the low frequency band may be 1 GHz or higher.

Moreover, the block diagram used for explaining the embodiments (FIG. 4) illustrates blocks of functional units. Those functional blocks (structural components) can be realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. For any of the above, as explained above, the realization method is not particularly limited to any one method.

Figure 8:
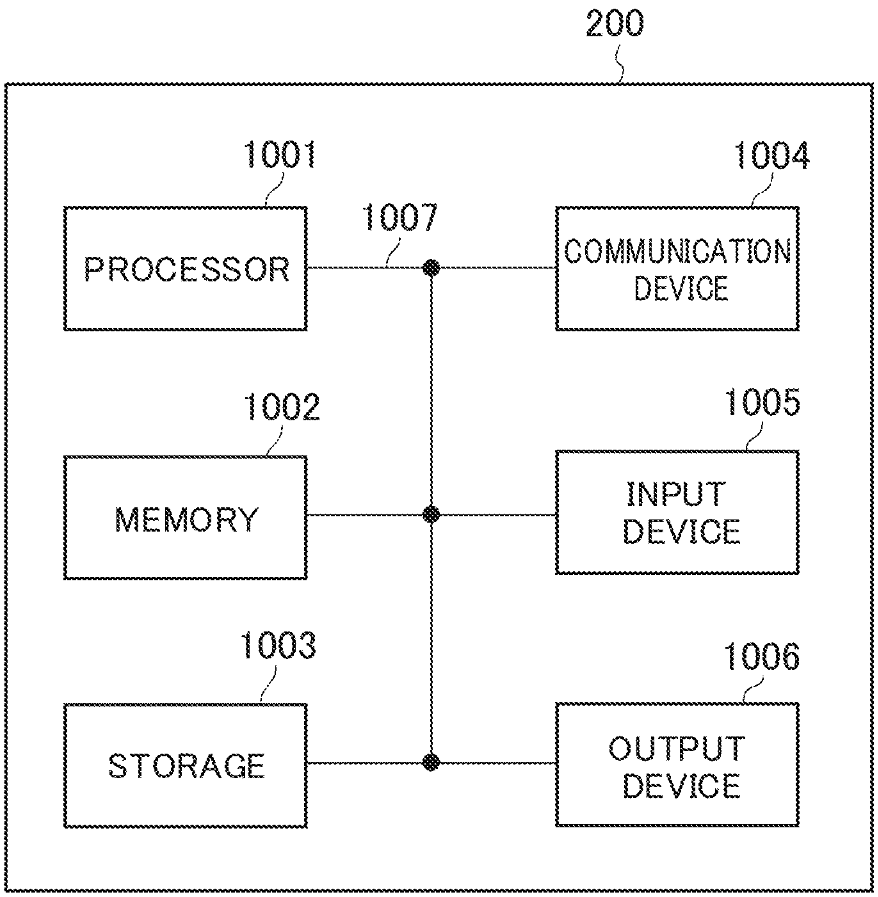
FIG. 8 is a diagram illustrating an example of a hardware configuration of the UE 200.

Furthermore, the UE 200 explained above can function as a computer that performs the processing of the radio communication method of the present disclosure. FIG. 8 is a diagram illustrating an example of a hardware configuration of the UE 200. As illustrated in FIG. 8, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks (see FIG. 4) of the UE 200 can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (computer program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, computer program code, computer program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be composed of one or more frames in the time domain. Each frame or frames in the time domain may be called a subframe. A subframe may also be composed of one or more slots in the time domain. The subframe may have a fixed time length (for example, 1 ms) that does not depend on numerology.

Numerology may be a communication parameter applied to transmission and/or reception of a signal or channel. Numerology may indicate at least one of subcarrier spacing (SCS), bandwidth, symbol length, cyclic prefix length, transmission time interval (TTI), number of symbols per TTI, radio frame configuration, specific filtering processing performed by a transmission/reception device in the frequency domain, a specific windowing processing performed by the transmission/reception device in the time domain, and the like for example.

A slot may be configured with one or more symbols (Orthogonal Frequency Division Multiplexing (OFDM) symbols, Single Carrier Frequency Division Multiple Access (SC-FDMA) symbols, etc.) in the time domain. A slot may be a time unit based on numerology.

The slot may include multiple mini-slots. Each mini-slot may be constituted by one or more symbols in the time domain. Also, the mini-slot may be called a sub-slot. A mini-slot may be composed of a smaller number of symbols than slots. A PDSCH (or PUSCH) transmitted in time units larger than mini-slots may be called PDSCH (or PUSCH) mapping type A. A PDSCH (or PUSCH) transmitted using a mini-slot may be called a PDSCH (or PUSCH) mapping type B.

Each of the radio frame, the subframe, the slot, the mini-slot, and the symbol represents a time unit when transmitting a signal. The radio frame, the subframe, the slot, the mini-slot, and the symbol may be referred in different names, respectively.

For example, one subframe may be called a transmission time interval (TTI), a plurality of consecutive subframes may be called a TTI, and one slot or one mini-slot called to as a TTI. In other words, at least one of the subframe and the TTI may be a subframe (1 ms) in the existing LTE, or may be a period shorter than 1 ms (for example, 1-13 symbols), or may be a period longer than 1 ms. Note that the unit representing the TTI may be called a slot, a mini-slot, or the like instead of a subframe.

Here, TTI refers to, for example, the minimum time unit of scheduling in radio communication. For example, in an LTE system, the base station performs scheduling to allocate radio resources (frequency band width that can be used in each user terminal, transmission power, etc.) to each user terminal in units of TTI. Note that the definition of TTI is not limited to the above.

The TTI may be a transmission time unit of a channel-encoded data packet (transport block), a code block, a codeword, or the like, or a processing unit such as scheduling or link adaptation. Note that when a TTI is given, a time section (for example, the number of symbols) in which a transport block, a code block, a codeword, and the like are actually mapped may be shorter than the TTI.

When one slot or one mini-slot is called a TTI, one or more TTIs (that is, one or more slots or one or more mini-slots) may be the minimum time unit for scheduling. Also, the number of slots (the number of mini-slots) constituting the minimum time unit of the scheduling may be controlled.

A TTI having a time length of 1 ms may be called a common TTI (TTI in LTE Rel. 8-12), a normal TTI, a long TTI, a common subframe, a normal subframe, a long subframe, a slot, and the like. A TTI shorter than the common TTI may be called a shortened TTI, a short TTI, a partial TTI (partial or fractional TTI), a shortened subframe, a short subframe, a mini-slot, a sub-slot, a slot, and the like.

Note that a long TTI (for example, a common TTI, a subframe, and the like) may be replaced with a TTI having a time length exceeding 1 ms, and a short TTI (for example, a shortened TTI, and the like) may be replaced with a TTI having a TTI length less than the TTI length of the long TTI and equal to or greater than 1 ms.

A resource block (RB) is a resource allocation unit in the time domain and the frequency domain, and may include one or more continuous subcarriers in the frequency domain. The number of subcarriers included in the RB may be the same regardless of the numerology, and may be 12, for example. The number of subcarriers included in the RB may be determined based on numerology.

Further, the time domain of the RB may include one or a plurality of symbols, and may have a length of one slot, one mini-slot, one subframe, or one TTI. One TTI, one subframe, and the like may each be configured with one or a plurality of resource blocks.

One or more RBs may be called a physical resource block (Physical RB: PRB), a subcarrier group (SCG), a resource element group (REG), a PRB pair, an RB pair, and the like.

Further, the resource block may be configured by one or a plurality of resource elements (RE). For example, one RE may be a radio resource area of one subcarrier and one symbol.

A bandwidth part (BWP) (which may be called a partial bandwidth, or the like) may represent a subset of contiguous common resource blocks (common RBs) for a certain numerology in a certain carrier. Here, the common RB may be specified by an RB index based on a common reference point of the carrier. A PRB may be defined in a BWP and numbered within the BWP.

The BWP may include a BWP for UL (UL BWP) and a BWP for DL (DL BWP). For the UE, one or more BWPs may be set in one carrier.

At least one of the set BWPs may be active and the UE may not assume to send or receive any given signal/channel outside the active BWP. Note that "cell", "carrier", and the like in the present disclosure may be read as "BWP".

The structures of the radio frame, subframe, slot, mini-slot, symbol, and the like described above are merely examples. For example, the number of subframes included in a radio frame, the number of slots per subframe or radio frame, the number of mini-slots included in a slot, the number of symbols and RBs included in a slot or mini-slot, and included in RB The number of subcarriers, the number of symbols in the TTI, the symbol length, the cyclic prefix (CP) length, and the like can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The terms "determining" and "determining" used in this disclosure may include a wide variety of operations. Regarding "determining" and "determining", for example, an execution of judging, calculating, computing, processing, deriving, investigating, searching (looking up, search, inquiry) (for example, searching in a table, a database, or another data structure), and ascertaining can be regarded as an execution of "determining" or "determining". Further, regarding "determining" and "determining", an execution of receiving (for example, receiving information), transmitting (for example, transmitting information), input, output, and accessing (for example, accessing data in a memory) may be regarded as an execution of "determining" or "determining". In addition, regarding "determining" and "determining", an execution of resolving, selecting, choosing, establishing, comparing, and the like can be regarded as an execution of "determining" or "determining". In other words, the "determining", an execution of any operation can be regarded as "determining" or "determining". Further, "determining (determining)" may be read as "assuming", "expecting", "considering", or the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims.

Therefore, the description of the present disclosure is for the purpose of illustration, and does not have any restrictive meaning to the present disclosure.

REFERENCE SIGNS LIST

10 Radio communication system
20 NG-RAN
100A, 100B, 100C BS
200 UE
210 Radio signal transmission/reception unit
220 Amplifier
230 Modulating/demodulating unit
240 Control signal/reference signal processing unit
250 Encoding/decoding unit
260 Data transmission/reception unit
270 Controller
1001 Processor
1002 Memory
1003 Storage
1004 Communication device
1005 Input device
1006 Output device
1007 Bus

The invention claimed is:

1. A terminal comprising:
a transmitter and a receiver configured to transmit and receive a control channel and a shared channel; and
a controller configured to assume that the control channel is allocated to a low frequency band and the shared channel is allocated to a high frequency band which is higher than the low frequency band,
wherein the controller does not assume allocation of the shared channel other than initial access in the low frequency band, and
wherein a physical downlink control channel (PDCCH) in one slot in the low frequency band schedules a plurality of slots of the shared channel in the high frequency band.

2. The terminal according to claim 1, wherein the controller does not assume allocation of the shared channel other than the terminal in an idle state in the low frequency band.

3. The terminal according to claim 2, wherein the controller assumes that different subcarrier spacing is applied in the low frequency band and the high frequency band.

4. The terminal according to claim 1, wherein the controller does not assume allocation of the control channel including a channel related to synchronization and initial access in the high frequency band.

5. The terminal according to claim 1, wherein the controller assumes that different subcarrier spacing is applied in the low frequency band and the high frequency band.

* * * * *